(12) United States Patent
Riffell

(10) Patent No.: US 10,421,132 B1
(45) Date of Patent: Sep. 24, 2019

(54) DRILL EXTENSION

(71) Applicant: Harold E Riffell, Pensacola, FL (US)

(72) Inventor: Harold E Riffell, Pensacola, FL (US)

( * ) Notice: Subject to any disclaimer, the term of this patent is extended or adjusted under 35 U.S.C. 154(b) by 0 days.

(21) Appl. No.: 15/391,754

(22) Filed: Dec. 27, 2016

(51) Int. Cl.
*B23B 51/12* (2006.01)

(52) U.S. Cl.
CPC ...... *B23B 51/126* (2013.01); *B23B 2260/094* (2013.01)

(58) Field of Classification Search
CPC . B23B 51/094; B23B 2260/094; B23B 51/12; B23B 2251/62
See application file for complete search history.

(56) References Cited

U.S. PATENT DOCUMENTS

| 921,644 | A | | 5/1909 | Forster | |
|---|---|---|---|---|---|
| 939,900 | A | | 11/1909 | Forster | |
| 1,376,139 | A | | 4/1921 | Porto | |
| 1,414,110 | A | | 4/1922 | Bocchio | |
| 2,545,659 | A | * | 3/1951 | Ginter | B23B 45/001 15/143.1 |
| 2,721,592 | A | | 10/1955 | Baker | |
| 2,754,864 | A | | 7/1956 | Elsy | |
| 2,812,791 | A | | 11/1957 | Mackey | |
| 3,011,369 | A | | 12/1961 | Russell | |
| 3,138,183 | A | | 6/1964 | Stewart | |
| 3,146,813 | A | | 9/1964 | Dirksen | |
| 3,474,838 | A | | 10/1969 | Schmitt | |
| 4,076,444 | A | | 2/1978 | Siebrecht | |
| 4,474,513 | A | | 10/1984 | Salyers | |
| 5,433,121 | A | | 7/1995 | Torra et al. | |
| 5,624,214 | A | | 4/1997 | Carroll | |
| 6,171,033 | B1 | | 1/2001 | Wrobel | |
| 7,802,948 | B1 | | 9/2010 | Bastiaans | |
| 2009/0194954 | A1 | * | 8/2009 | Hsu | B23B 51/126 279/144 |
| 2011/0217134 | A1 | | 9/2011 | Rizzo | |
| 2017/0108327 | A1 | * | 4/2017 | Eichelberger | B23B 29/02 |

FOREIGN PATENT DOCUMENTS

| DE | 102007001074 A1 | * | 7/2008 | ............ B23B 49/00 |
|---|---|---|---|---|
| FR | 3026328 A1 | * | 4/2016 | ............ B23B 49/00 |

OTHER PUBLICATIONS

English translation of FR3026328, Apr. 2016.*

* cited by examiner

*Primary Examiner* — Alan Snyder
(74) *Attorney, Agent, or Firm* — Peter Loffler

(57) ABSTRACT

A drill extension for extending the working reach of a drill uses a hollow tubular body that has a shaft rotatably disposed therein and held therein by a pair of spaced apart bearings, each bearing attached to an inner surface of the body. The shaft has a male end that is received within a chuck of the drill and an opposing female receiver for receiving a shaft of a drill or the male end of another drill extension. A handle is attached the outer surface of the body member such that the handle has a ring member that is received within an encircling groove on the outer surface of the body member, the handle also has a grasp arm. At least one level is attached to the outer surface and is oriented either radially with respect to a longitudinal axis of the body member or in parallel with the axis or both.

9 Claims, 6 Drawing Sheets

DRILL EXTENSION

BACKGROUND OF THE INVENTION

1. Field of the Invention

The present invention relates to a drill extension wherein the extension allows the drill bit to operate an extended and variable distance from the drill proper and wherein the drill extension is effectively usable by a single operator.

2. Background of the Prior Art

The handheld drill is a ubiquitous tool at a construction site. The drill, which can be a plugin but is typically battery operated, is effective in drilling needed openings as well as driving screws and bolts into position. Although the drill is commonly associated with the framing and other woodworking trades such as finish carpenters, cabinet makers and deck builders, many tradesmen that build with non-wood materials rely on the handheld drill in order to get their job done in a fast and efficient manner.

For example, both plumbers and electricians rely on drills for various purposes, especially during new construction. In running conduit or piping through frame studs, an opening must be made to allow the conduit or pipe to pass through. The handheld drill serves this function well. Another area that relies on the drill is in placement of either an electrical mast or a vent pipe. In such scenarios, an opening must be created in both the ceiling and the roof (and possibly one or more floors on a multistory building), through which opening an electrical conduit is passed to meet up with a weather head in the case of electrical work or a vent pipe is passed and terminated above the roof in the case of plumbing work. In either case, the series of openings created need to align vertically with one another in order for the conduit or the vent pipe to rise through the building vertically so as to be properly installed.

One method of assuring that the series of openings arise vertically is for the tradesman to create the initial opening above the commencement point of the conduit or vent pipe and thereafter use a plumb bob or similar instrument (such as a laser marker) to align each successive opening above the initial opening created. While effective, this method of opening creation is time-consuming and can prove quite difficult when there is little space to operate in creating successive openings such as can happen close to the edge of a roofline where there is scant little space in the attic for a tradesman to operate. In such cases, a tradesman often eyeballs the location of a successive opening and hopes for the bets. If the successive opening is not aligned, then a repair may be required which itself is time-consuming and costly, especially if roof boards and shingles need to be torn out and replaced.

To address these issues, drill extensions have been proposed. Drill extensions, which come in varied architectures, have a proximal end with a shank thereon that is received by the chuck of the drill and a distal end that has the drill bit thereon with a mechanical transfer shaft disposed therebetween in order to transfer the drill's output to the drill bit in order to drive the drill bit in the usual way. The extension, which can be several feet long, allows the drill bit to be distal of the drill itself, allowing a tradesman to be located distal of the drill site. In this way, the tradesman can stand on a floor or ground surface or possibly a ladder and drill an opening into a ceiling and then pass the drill extension through this opening and drill another opening into a roof (or upper floor). If the tradesman is able to keep the drill and its drill bit laden extension properly vertical during the drilling process, then the openings so created are vertically aligned. However, keeping the drill extension in a vertical orientation will performing the drilling operation is no easy feat. A drill extension tends to be a relatively heavy implement and when it is upwardly positioned, creates a moment torque upon the drill operator making holding of the device steady for an extended time—the time it takes to drill two or more openings—difficult. This tends to fatigue the operator in a relatively short amount of time making proper operation of the drill system difficult with the extension often swaying back and forth, thereby creating a risk of making improper openings.

Accordingly, many tradesmen employ a second person to help hold the drill extension steady during the opening creation process. The second person helps relieve the torque stress and fatigue experienced by a solo operator. Nevertheless, even when two people are operating the drill system, creating vertically aligned openings still tends to be a challenge as many operators rely on eyeballing the drill system for vertical alignment only to realize that their eyesight was off and a costly and time-consuming repair is at hand.

Another problem with current drill extensions lies in the fact that often the drill extension lacks sufficient length to drill all required aligned openings even if the user is standing on a ladder. As such, the tradesman must rely on standard aligned opening creation techniques to create at least some of the openings with the techniques' attendant shortcomings A drill extension system is needed that allows the extension of a drill bit from its drill so that the drill is capable of operating distally of the drill, which system addresses the above mentioned shortcomings found in the art. Such a drill extension system must allow a single operator to be able to effectively use the device without the risk of early fatigue due to the weight of the device, especially the torque created by holding the device in a vertical position. Such a device must help assure that the device including the drill bit proper are in a true vertical alignment when actually drilling the series of openings. Such a system must have sufficient length to be able to create aligned openings in most standard situations, even in multistory building settings.

SUMMARY OF THE INVENTION

The drill extension of the present invention addresses the aforementioned needs in the art by providing a drill extension that is usable with most convention handheld drills, either plug in or battery operated, wherein the drill extension allows a tradesman to drill openings several feet from the drill proper. The drill extension allows a single user to effectively handle the device including the drill and not become easily fatigued so that properly aligned openings can be drilled with the device. The drill extension allows a user to verify that the device is properly aligned. The drill extension is modular so that multiple aligned openings, possibly across multiple floors of a building, can be easily and effectively produced using the device. The drill extension is of relatively simple design and construction, being produced using standard manufacturing techniques, so that the device is relatively inexpensive to produce and is thus economically attractive to potential consumers for this type of device.

The drill extension of the present invention is comprised of a hollow tubular body member that has a first end and a second end. The body member has an inner surface and an outer surface. A first bearing is attached to the inner surface of the body member proximate the first end while a second bearing is attached to the inner surface of the body member proximate the second end. A shaft has a male end and an opposing female receiver joined with the male end by a shank, the shaft being rotatably disposed within the body member such that the shank is received within the first bearing and within the second bearing, allowing the shaft to rotate. A handle is attached to the outer surface of the body member. The handle has a grasp arm attached to a ring member such that the ring member is received within a groove that encircles the outer surface of the body member. A stop collar is attached to the first bearing with the shank of the shaft passing through the stop collar in order to retain the shaft in position within the body member. At least one level is attached to the outer surface of the body member and is radially oriented with respect to a longitudinal axis of the body member or is oriented in parallel or both (2 levels used).

BRIEF DESCRIPTION OF THE DRAWINGS

Similar reference numerals refer to similar parts throughout the several views of the drawings.

DESCRIPTION OF THE PREFERRED EMBODIMENT

Figure 1:
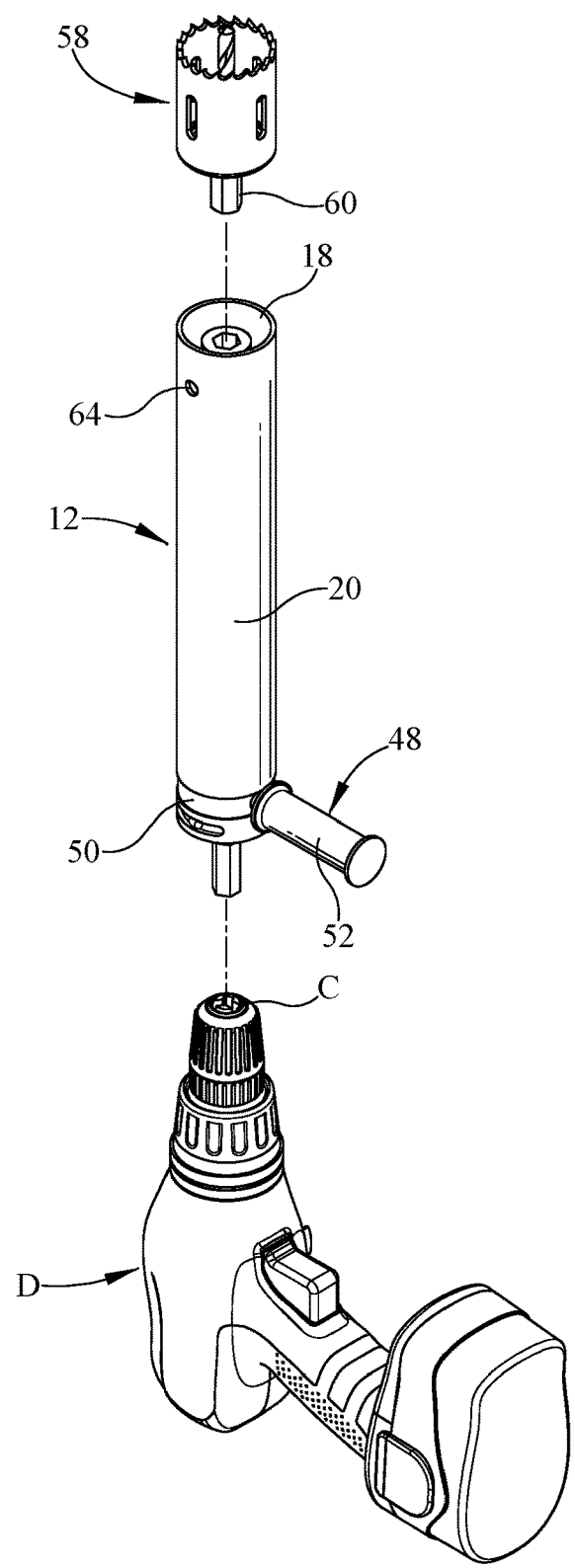
FIG. 1 is a perspective view of the drill extension of the present invention including a drill and drill bit.
Figure 2:
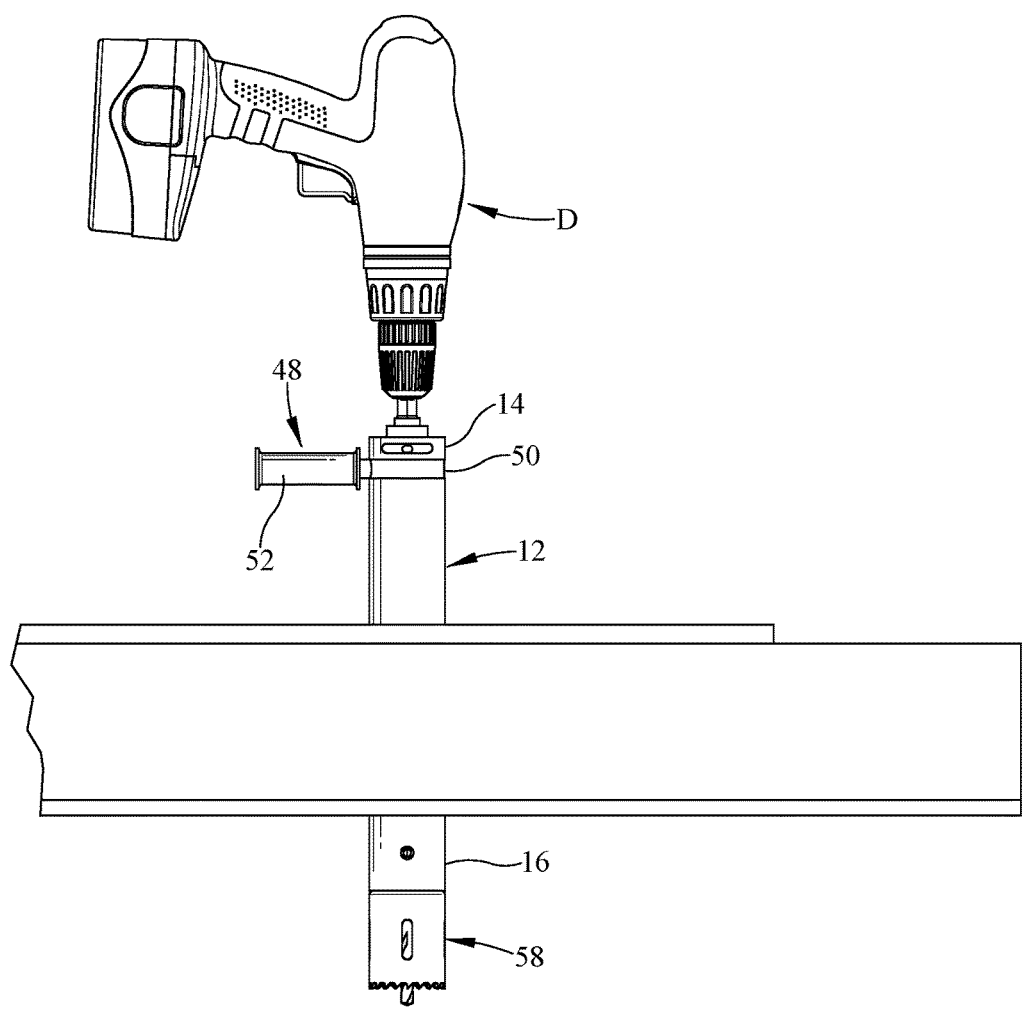
FIG. 2 is an elevation view of the drill extension being used to drill an opening.
Figure 3:
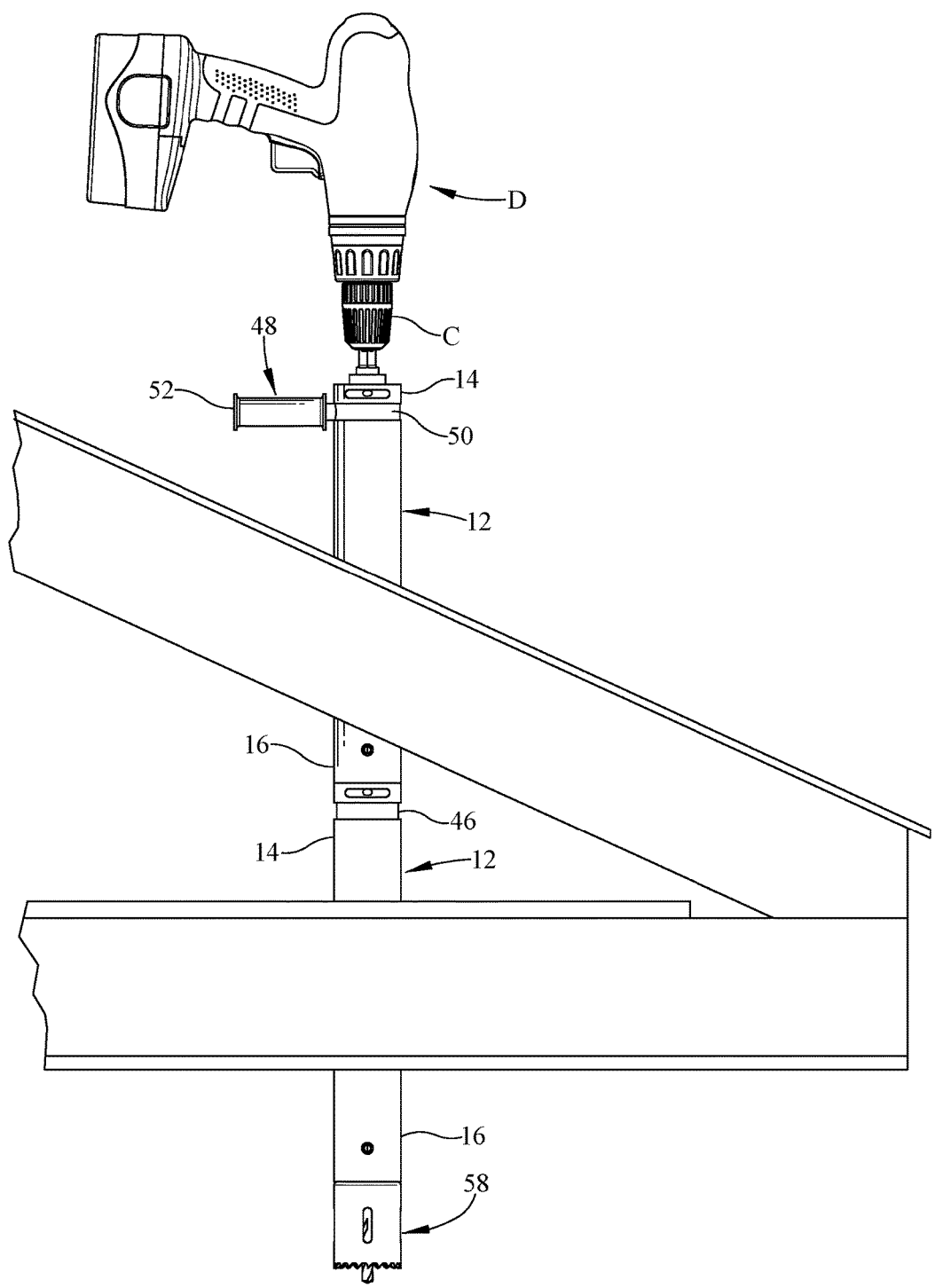
FIG. 3 is an elevation view of the drill extension being used to drill a pair of aligned openings.
Figure 4:
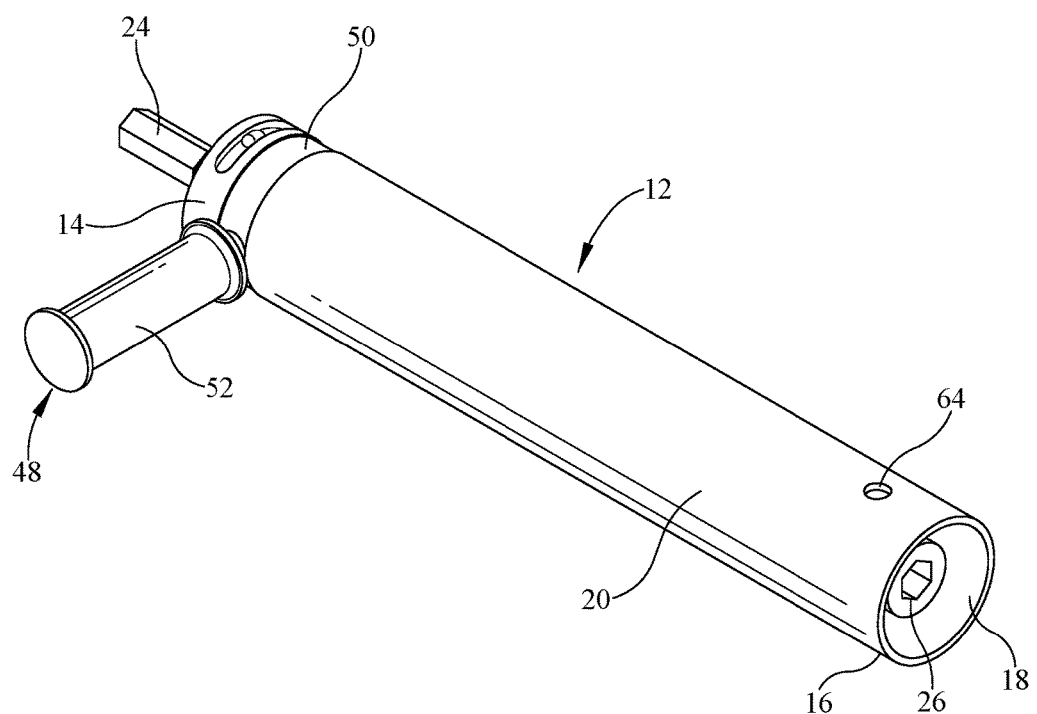
FIG. 4 is a perspective view of the drill extension.
Figure 5:
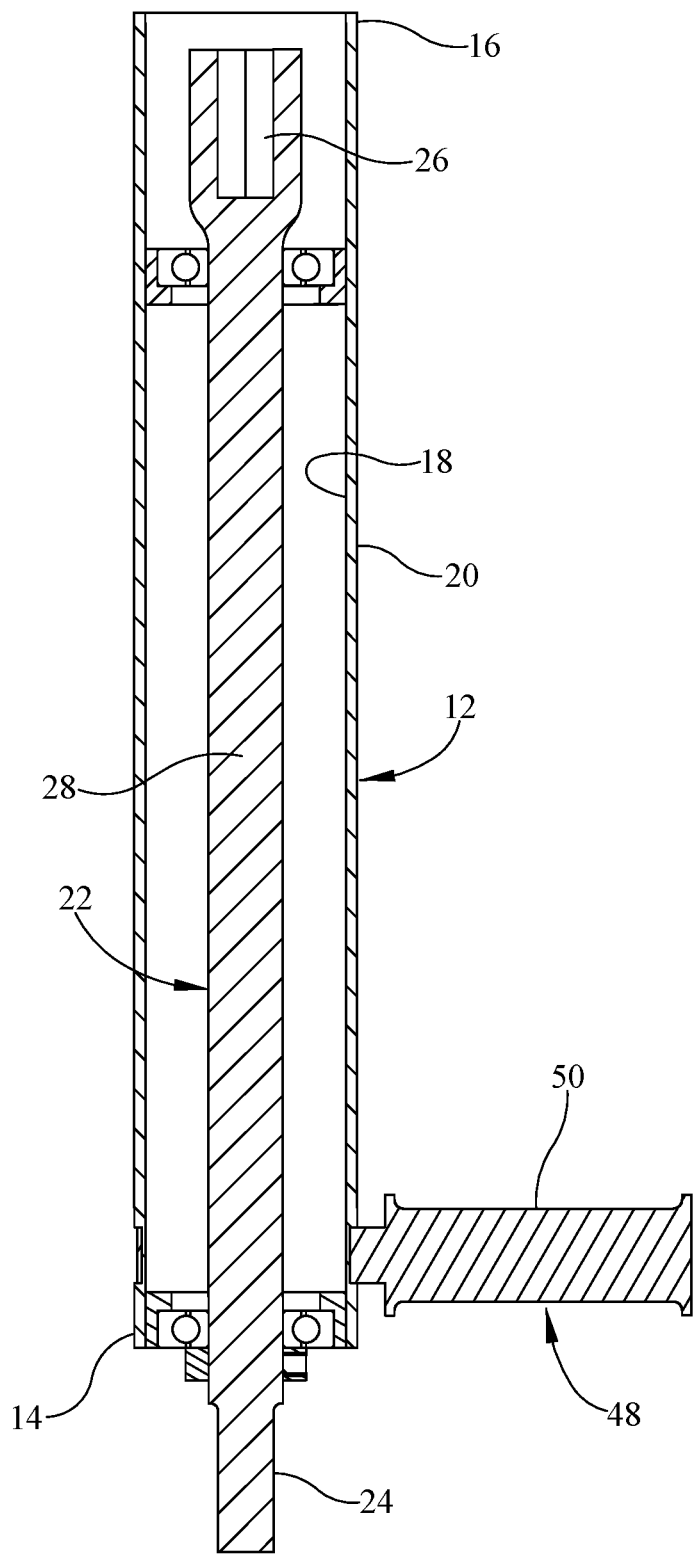
FIG. 5 is a side sectioned view of the drill extension.
Figure 6:
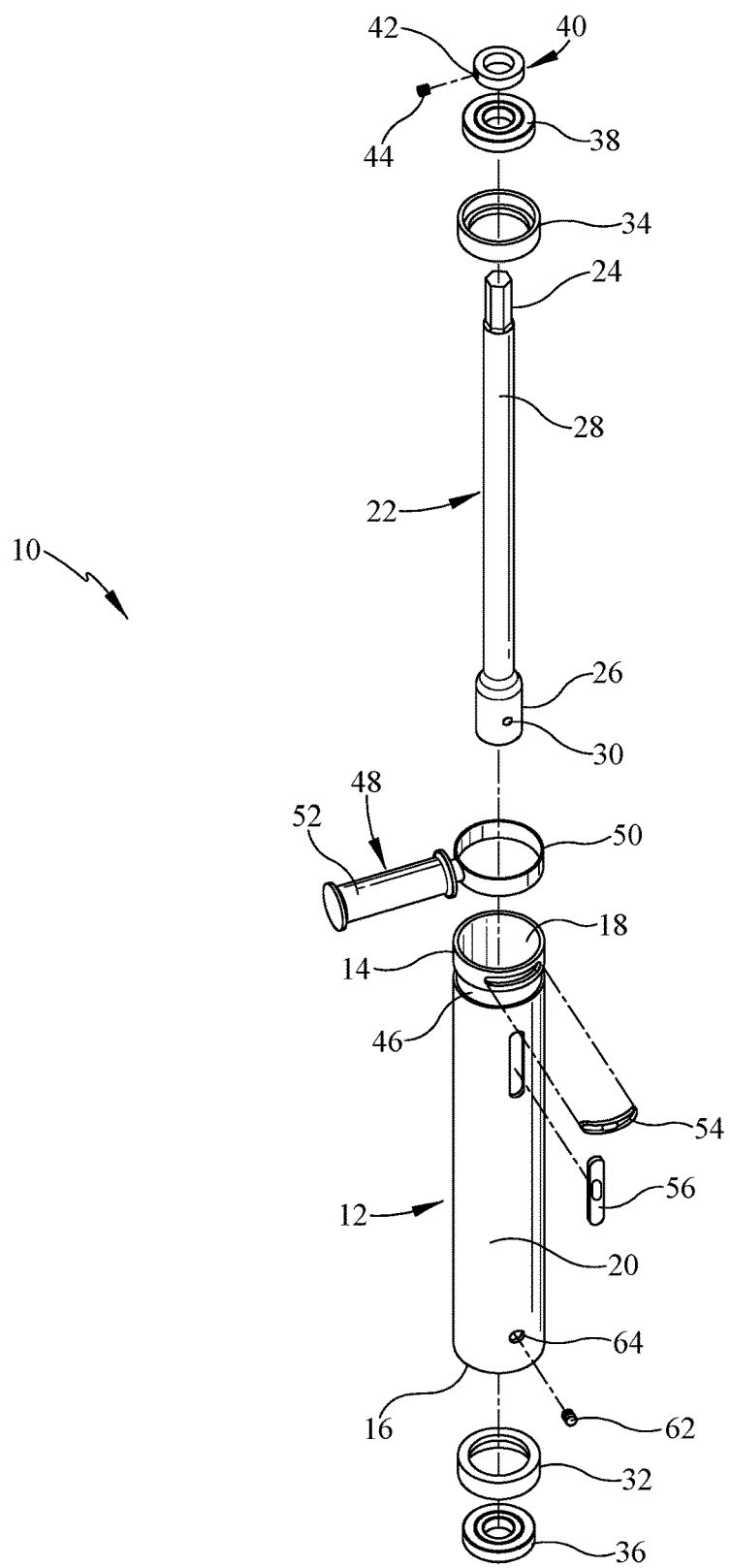
FIG. 6 is an exploded perspective view of the drill extension.

Referring now to the drawings, it is seen that the drill extension of the present invention, generally denoted by reference numeral 10, is comprised of a body member 12 that is a hollow tubular member that has a first end 14 and a second end 16, an inner surface 18 and an outer surface 20. The body member 12 is made from an appropriate strong rigid material such as aluminum or plastic. A body member shaft 22 is disposed within the hollow interior of the body member 12 and is capable of rotating therein. As seen, the body member shaft 22 has a hex male end 24 and a hex receiving female receiver 26 joined by a rounded shank 28. The female receiver 26 has an opening 30. The body member shaft 22 is mounted within the hollow interior of the body member 12 by providing a first bearing carrier 32 that is attached to the inner surface 18 of the body member 12 proximate the body member's first end 14 and providing a second bearing carrier 34 that is attached to the inner surface 18 of the body member 12 proximate the body member's second end 16. A first bearing 36 is held within the first bearing carrier 32 while a second bearing 38 is held within the second bearing carrier 34. The shank 28 of the body member shaft 22 proximate the male end 24 is held within the first bearing 36 while the shank 28 of the body member shaft 22 proximate the female receiver 26 is held within the second bearing 38. The body member shaft 22 is free to rotate within the first bearing 36 and the second bearing 38 in normal fashion. As seen, a stop collar 40 having an opening 42 is attached to and rotates with the first bearing 36 such that a set screw 44 is passed into the opening 42 in order to engage the body member shaft 22 in order to hold the body member shaft 22 is properly in place with respect to the first bearing 36 and the second bearing 38.

As seen, a groove 46 encircles the outer surface 20 of the body member 12 proximate either the first end 14 or the second end 16 or both. A handle 48 has a ring member 50 and a grasp arm 52 such that the ring member 50 is positioned within the groove 46 and engages the body member 12 in order to provide a handle mechanism for the body member 12. The height of the ring member 50 approximates the height of the groove 46 in order to provide a snug fit of the ring member 50 within the groove 46. Additionally, the ring member 50 is capable of either opening or having its diameter being capable of changing in order to allow the ring member to fit into the groove 46 and be cinched therein possibly sliding over the main portion of the body member 12 for proper placement into the groove 46.

As seen, a first level 54 is attached to the outer surface 20 of the body member and is radially positioned (with respect to the longitudinal axis of the body member 12) thereon. If desired, a second level 56 may be attached to the outer surface of the body member 12 in appropriate fashion, possibly within a groove, and is longitudinally positioned (with respect to the longitudinal axis of the body member 12) therein.

In order to use the drill extension 10 of the present invention, the male end 24 of the body member shaft 22 is received within the chuck C of a drill D and secured therein in the usual way. A drill bit 58 of any appropriate design is provided such that the drill bit's shaft 60 is received within the female receiver 26 of the body member shaft 22, the shape of the drill bit's shaft 60 corresponding to the shape of the female receiver 26 of the body member shaft 22. The drill bit 58 is secured in place via a set screw 62 that is passed through the opening 30 of the female receiver 26 and tightened. Access to the opening 30 on the female receiver 26 is via an opening 64 on the body member 12 such that the body member shaft 22 is rotated until the opening 30 on the female receiver 26 is aligned with the opening 64 on the body member 12 and an appropriate tool such as a screw driver (not illustrated) is passed through the aligned openings 30 and 64 in order to allow access to the set screw 62 so that it can be tighten. The drill extension 10 is now ready for use. A user can easily maneuver the device by grasping the drill D with one hand and the grasp arm 52 of the handle 48 with the other hand for solid control of the drill D and the attached drill extension 10. As the drill D rotates, the rotational output is transferred to the drill bit 58 via the body member shaft 22 which rotates with drill D rotation. The user can assure that the drill extension 10 is properly oriented via observation of the first level 54 and possibly the second level 56 if provided.

If the drill extension 10 needs to be longer, once the drill extension 10 is secured to the drill D, a second drill extension is provided and is attached to the first drill extension (the one attached directly to the drill D) by having the male end 24 of the second drill extension be received within the female receiver 26 of the first drill extension 10. The second drill extension is secured to the first drill extension 10 via the aforementioned set screw 62 that is tightened against the male end 24 of the body member shaft 22 of the second drill extension. A drill bit 58 is attached to the second drill extension in the manner previously described. If desired, more than two drill extensions can be chained together in this fashion. For multiple chaining of drill extensions 10, additional personnel can be used to help properly hold the overall device via the handles 48 that are attached to each of the individual drill extensions 10.

While the invention has been particularly shown and described with reference to an embodiment thereof, it will be appreciated by those skilled in the art that various changes in form and detail may be made without departing from the spirit and scope of the invention.

I claim:

1. A drill extension comprising:
    a first hollow tubular body member having a first end and a second end and having a first inner surface and a first outer surface and a first interior;
    a first bearing attached to the first inner surface of the first body member proximate the first end;
    a second bearing attached to the first inner surface of the first body member proximate the second end;
    a first shaft having a first male end and an opposing first female receiver joined by a first shank, the first shaft rotatably disposed within the first body member such that the first shank is received within the first bearing and within the second bearing such that the first female receiver is fully disposed within the first interior;
    a second hollow tubular body member having a third end and a fourth end and having a second inner surface and a second outer surface and a second interior;
    a third bearing attached to the second inner surface of the second body member proximate the third end;
    a fourth bearing attached to the second inner surface of the second body member proximate the fourth end;
    a second shaft having a second male end and an opposing second female receiver joined by a second shank, the second shaft rotatably disposed within the second body member such that the second shank is received within the third bearing and within the fourth bearing such that the second female receiver is fully disposed within the second interior and such that the first body member is connected to the second body member so that the second end of the first body member abuts the third end of the second body member and such that the second male end of the second shaft is received within the first female received of the first shaft so that rotation of the first shaft rotates the second shaft in lockstep; and
    a handle attached to the first outer surface of the first body member wherein the handle has a grasp arm attached to a ring member such that the ring member is received within a first groove that encircles the first outer surface of the first body member.

2. The drill extension as in claim 1 further comprising a stop collar attached to the first bearing, the shank of the shaft passing through the stop collar.

3. The drill extension as in claim 2 further comprising a first level inset within a second groove within the outer surface of the body member, the first level radially oriented with respect to a longitudinal axis of the body member.

4. The drill extension as in claim 3 further comprising a second level inset within a third groove within the outer surface of the body member, the second level oriented in parallel with respect to the longitudinal axis of the body member.

5. The drill extension as in claim 2 further comprising a level inset within a second groove within the outer surface of the body member, the level oriented in parallel with respect to a longitudinal axis of the body member.

6. The drill extension as in claim 1 further comprising a stop collar attached to the first bearing, the shank of the shaft passing through the stop collar.

7. The drill extension as in claim 1 further comprising a first level inset within a second groove within the outer surface of the body member, the first level radially oriented with respect to a longitudinal axis of the body member.

8. The drill extension as in claim 7 further comprising a second level inset within a third groove within the outer surface of the body member, the first level oriented in parallel with respect to the longitudinal axis of the body member.

9. The drill extension as in claim 1 further comprising a level inset within a second groove within the outer surface of the body member, the level oriented in parallel with respect to a longitudinal axis of the body member.

* * * * *